United States Patent [19]

Nakagawa et al.

[11] Patent Number: 5,650,834
[45] Date of Patent: Jul. 22, 1997

[54] ACTIVE-MATRIX DEVICE HAVING SILICIDE THIN FILM RESISTOR DISPOSED BETWEEN AN INPUT TERMINAL AND A SHORT-CIRCUIT RING

[75] Inventors: Naoki Nakagawa; Hironori Aoki; Hiroaki Shimaya, all of Kikuchi-gun, Japan

[73] Assignees: Mitsubishi Denki Kabushiki Kaisha; Asahi Glass Company Ltd., both of Tokyo, Japan

[21] Appl. No.: 363,030

[22] Filed: Dec. 23, 1994

[30] Foreign Application Priority Data

Jul. 5, 1994 [JP] Japan ................... 6-153621

[51] Int. Cl.$^6$ ................... G02F 1/1343
[52] U.S. Cl. ................... 349/139; 349/147
[58] Field of Search ................... 359/57, 59, 60, 359/87; 349/41, 42, 50, 139

[56] References Cited

U.S. PATENT DOCUMENTS

| | | | |
|---|---|---|---|
| 4,857,907 | 8/1989 | Koden | 359/59 |
| 5,068,748 | 11/1991 | Ukai et al. | 359/59 |
| 5,200,876 | 4/1993 | Takeda et al. | 359/59 |
| 5,233,448 | 8/1993 | Wu | 359/59 |
| 5,283,449 | 2/1994 | Ooka | 257/204 |
| 5,323,254 | 6/1994 | Pitt | 359/60 |
| 5,335,102 | 8/1994 | Kanemori et al. | 359/59 |
| 5,373,337 | 12/1994 | Ogawa et al. | 359/59 |
| 5,467,882 | 11/1995 | Ahn | 216/23 |
| 5,471,329 | 11/1995 | Nakajima et al. | 359/59 |
| 5,498,573 | 3/1996 | Whetten | 437/192 |
| 5,504,348 | 4/1996 | Yoshida et al. | 359/54 |

FOREIGN PATENT DOCUMENTS

| | | |
|---|---|---|
| 62-219662 | 9/1987 | Japan . |
| 64-3827 | 1/1989 | Japan . |
| 2-186326 | 7/1990 | Japan . |
| 3-116117 | 5/1991 | Japan . |
| 5-181157 | 7/1993 | Japan . |
| 06-258668 | 9/1994 | Japan . |

OTHER PUBLICATIONS

Murarka, "Properties & Applications Of Silicides", Rensselaer Polytechnic Institute Center for Intergrated Electronics, pp. 275–323.

*Primary Examiner*—Anita Pellman Gross
*Assistant Examiner*—Toan Ton
*Attorney, Agent, or Firm*—Burns, Doane, Swecker & Mathis, LLP

[57] ABSTRACT

An active-matrix substrate including a transparent insulative substrate, thin film transistors arranged in a matrix pattern on the transparent substrate, pixel electrodes each connected to a drain electrode of each of the thin film transistors, a plurality of gate lines each adapted to supply a signal to a gate electrode of each of the thin film transistors, a plurality of source signal lines intersecting the plurality of gate lines and each adapted to supply a signal to a source electrode of each of the thin film transistors, a shortcircuiting ring for shortcircuiting each of the signal lines at the periphery of the transparent insulative substrate, and a thin film resistor having a resistance of 10 kΩ to 500 kΩ provided intermediate between an input terminal of each of the signal lines and the shortcircuiting ring.

4 Claims, 9 Drawing Sheets

ACTIVE-MATRIX DEVICE HAVING SILICIDE THIN FILM RESISTOR DISPOSED BETWEEN AN INPUT TERMINAL AND A SHORT-CIRCUIT RING

BACKGROUND OF THE INVENTION

The present invention relates to active-matrix substrates for use in matrix-type display devices such as liquid crystal display devices. More particularly, it relates to an active-matrix substrate in which a gate signal line and a source signal line are shortcircuited by means of a shortcircuiting ring to prevent static electricity from causing a break of a signal line or thin film transistor and an insulation breakdown between signal lines, and which can be tested for its characteristics of pixels such as thin film transistor prior to being assembled into a display device.

A typical matrix-type display device such as a liquid crystal display device (hereinafter referred to as "LCD") comprises a pair of opposing substrates sandwiching a display material such as a liquid crystal which is adapted to be selectively applied with a voltage. As shown in the schematic equivalent circuit of FIG. 8, one of these substrates includes source signal lines 5 and gate signal lines 4 which intersect each other in a matrix manner, and, in each region defined by these lines 4 and 5, a pixel electrode 2, a thin film transistor (hereinafter referred to as "TFT") 1 as a switching element for selectively applying a voltage to each pixel electrode 2, and a capacitor 3 for retaining electric charge.

Such an active-matrix substrate is likely to generate static electricity fabrication in various processes and handling because it undergoes frictional treatments such as a rubbing treatment in its fabrication procedure and in the later liquid crystal panel constructing process. Discharge of thus generated static electricity may cause the TFT 1 to be broken or the insulation film at the intersection of signal lines 4 and 5 to be broken down. To avoid a break due to such static electricity, a countermeasure is taken such that respective input terminals 5a, 4a of the source and gate signal lines 5, 4 are shortcircuited to a low electric resistance shortcircuiting ring (hereinafter referred to as "low-resistance shortcircuiting ring") 7 provided in the periphery of the substrate by way of low electric resistance lines 7a formed of the same material as that of the source signal line 5 or gate signal line 4, as shown in FIG. 8.

Figure 8:
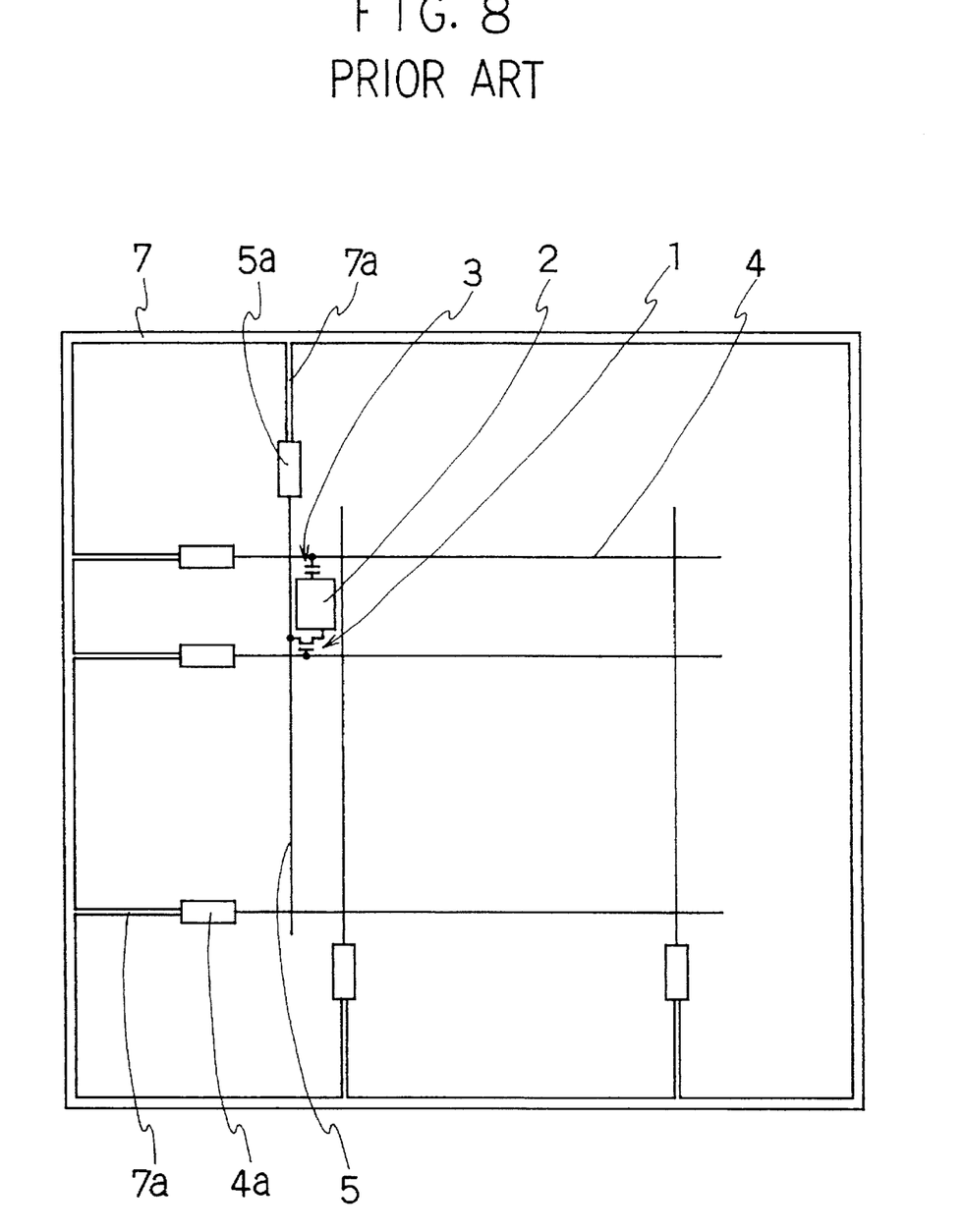
FIG. 8 is a schematic equivalent circuit diagram of a conventional active-matrix substrate.

The active-matrix substrate shown in FIG. 8, as disclosed in, for example, Japanese Unexamined Patent Publication No. 290624/1991, is provided with the low-resistance shortcircuiting ring 7 in its periphery to which respective input terminals 5a, 4a of the source signal line 5 and gate signal line 4 are connected by way of shortcircuiting lines 7a. Accordingly, even if the substrate is charged with static electricity, the static electricity is discharged through the shortcircuiting ring 7 thereby preventing insulation breakdown between signal lines and breakage of a TFT. However, since the source signal line 5 and the gate signal line 4 are connected to each other through a low-resistance line, application of a voltage for testing each pixel for its characteristics of pixels such as TFT or for a possible shortcircuit would cause a heavy electric current to flow. It is, therefore, impossible to check the substrate for an interlayer shortcircuit between gate and source or to measure the characteristics of pixels such as TFT.

For this reason, it is a conventional practice to carry out an electric test on the active-matrix substrate by applying a voltage across respective input terminals 5a, 4a of the source signal line 5 and gate signal line 4 after bonding the active-matrix substrate to its counterpart substrate, introducing a liquid crystal material to between the substrates and cutting off the aforementioned low-resistance shortcircuiting line 7a. Accordingly, when a failure such as insulation failure between signal lines is found out in the test, the entire panel including the two substrates becomes defective. Since parts such as a color filter provided to the counterpart substrate in particular are expensive, failure of such parts becomes one of the causes of increased cost. In addition, since the shortcircuit test must be carried out at the final stage of the fabrication of the active-matrix display device, possible process abnormalities during the substrate fabrication cannot be fed back promptly, thus interfering with improvements in production yield and product quality.

Japanese Unexamined Patent Publication No. 27263/1993 has proposed a method of forming a TFT of the same type as the TFT forming part of each pixel between shortcircuiting ring 7 and each signal line to insert a resistor therebetween. However, the resistance of the resistor is extremely high, or several mega-ohms (MΩ) and, hence, this method is inadequate as a countermeasure against the problem of static electricity.

Japanese Unexamined Patent Publication No. 116117/1991 has disclosed a device wherein a shortcircuiting ring is formed of an MoTa or ITO film, the material of which is the same as that of a gate signal line or pixel electrode, to have a high electric resistance (hereinafter referred to as "high resistance") in a range required for the countermeasure against the problem of static electricity thereby allowing the active-matrix substrate in a state before being assembled into a display device to be subjected to an electric test. In the case of the shortcircuiting ring having a relatively high resistance, since the ring is usually grounded at a certain point of the ring to discharge static electricity, the resistance between the grounded point and a signal line significantly spaced apart therefrom is remarkably high. For example, if there are one hundred signal lines, the resistance between the grounded point and the line at the farthest location therefrom is 100 times as high as the resistance between the grounded point and the line at the nearest location therefrom. Accordingly, uniform discharge effect is impossible for all the lines. In addition, there is no disclosure about a specific range of the electric resistance required for the countermeasure against the problem of static electricity. If the resistance (hereinafter referred to as "resistance") of the shortcircuiting ring is set to a value stably allowing the discharge of static electricity for, for example, one hundred lines, the resistance between adjacent lines becomes low and, hence, an electric test such as for shortcircuiting between adjacent lines cannot be satisfactorily accomplished.

Japanese Unexamined Patent Publication No. 219662/1987 has disclosed an art of interconnecting gate lines, drain lines, and gate lines and drain lines through amorphous silicon doped with an impurity to discharge static electricity thereby avoiding insulation breakdown and allowing an electric test. Like the foregoing Japanese Unexamined Patent Publication No. 116117/1991, this art also causes a problem that the resistance between the grounded point and a line spaced apart therefrom is equal to the sum of respective resistances between lines lying therebetween of which resistances are connected in series, resulting in unsatisfactory discharge of static electricity. In addition, although the resistance of the amorphous silicon film doped with an impurity is not mentioned therein, such an amorphous silicon film typically has a sheet resistance of several mega-ohms (MΩ) or higher per unit area and, hence, it is difficult to obtain a satisfactory shortcircuiting effect for allowing static electricity discharge.

Japanese Unexamined Utility Model Publication No. 3827/1989 has disclosed in the specification thereof an art of connecting each gate line terminal and each drain line terminal to a common electrode line (shortcircuiting ring) through a high-resistance layer to avoid breakage of a component such as TFT due to static electricity and to enable an electric test, wherein an amorphous silicon film having a resistance of several MΩ is used as the high-resistance layer. However, the high-resistance Si film having a resistance of several mega-ohms (MΩ) does not enable satisfactory discharge of static electricity.

It is, therefore, an object of the present invention to provide an active-matrix substrate wherein a thin film resistor of 10 to 500 kΩ is provided intermediate between each of source and gate signal lines and a shortcircuiting ring of low resistance thereby assuredly avoiding a break of a component such as TFT due to static electricity while allowing the substrate in a state prior to being assembled into a display to be subjected to an electric test for the characteristics of each pixel component such as TFT and for a possible shortcircuit between source signal line and gate signal line, between source signal lines or between gate signal lines. Such an active-matrix substrate will contribute to improvements in production yield and product quality.

It is another object of the present invention to provide an active-matrix substrate having a thin film resistor formed of a silicide film which can be fabricated with fewer production steps.

Intensive study has been repeatedly made to obtain an active-matrix substrate which is prevented from troubles such as a break down of a signal line or TFT or a breakdown of an interlayer insulator film intermediate signal lines and which, in a state prior to being assembled into a display, is capable of undergoing a shortcircuit test for a possible shortcircuit between signal lines. As a result, there has been found the fact that by connecting the input terminal of each signal line to a shortcircuiting ring through a thin film resistor of 10 to 500 kΩ, static electricity is discharged through the shortcircuiting ring while the thin film resistor causes leakage current to decrease when the substrate undergoes a test for the characteristics of each pixel component such as TFT. This means that discharging of static electricity stands together with the leakage test. More specifically, since the substrate is usually charged with static electricity of a high voltage in the range of about several hundred volts (V) to about several kilo-volts (kV) and a capacitance of about 0.1 to about 1 nF exists between the gate lines and the source lines in the TFT array, each TFT is protected from troubles such as shifting of its threshold voltage $V_{th}$ while a break due to discharge of static electricity between signal lines is prevented by decreasing the voltage of static electricity to 50 V or below in about 0.01 seconds. To decrease the voltage of static electricity to 50 V or below in 0.01 seconds, a time constant of 0.001 seconds is required and, hence, the resistance of an electric path from the input terminal of each signal line through the shortcircuiting ring to the grounded point is required to be set to 500 kΩ or lower.

On the other hand, when the active-matrix substrate undergoes the test in a state before assembled into a display device, a method is usually employed of measuring the amount of electric charge accumulated within a pixel. Since this method is implemented by applying a usual drive voltage to a gate signal line and a source signal line and measuring the current in the source signal line, the shortcircuiting ring becomes a shunt circuit. It has been found that by setting the shunted current in the shortcircuiting ring to 1/10 or lower of the current in a pixel, the test for characteristics of pixels such as TFT can be accurately achieved. Since the resistor connected to the shortcircuiting ring is in parallel with a resistor connected to the circuit, such as an integrating circuit, of the device for measuring the current in the pixel and the latter resistor typically has a resistance of not higher than 1 kΩ, the former resistor is required to have a resistance ten times or more as high as the resistance of the latter resistor, i.e., 10 kΩ or higher so as to set the shunted current in the shortcircuiting ring to 1/10 or lower of the current in the pixel.

Thus, the provision of the thin film resistor of 10 to 500 kΩ intermediate between the input terminal of each signal line and the shortcircuiting ring allows the active-matrix substrate to be protected from troubles due to static electricity and to undergo an electric test for the characteristics of each pixel and for a possible shortcircuit between signal lines. A shortcircuit between signal lines can readily be detected by the aforementioned method of measuring the amount of electric charge at each pixel since the current abnormally increases due to the shortcircuit. In addition, the use of the thin film resistor of ITO or silicide makes it possible to easily obtain a resistance of about 10 to about 500 kΩ while allowing the thin resistor itself to be formed simultaneously with the electrodes or TFTs in the same fabrication process.

SUMMARY OF THE INVENTION

According to one aspect of the present invention, there is provided an active-matrix substrate comprising a transparent insulative substrate, thin film transistors arranged in a matrix pattern on the transparent substrate, pixel electrodes each connected to a drain electrode of each of the thin film transistors, a plurality of gate lines each adapted to supply a signal to a gate electrode of each of the thin film transistors, a plurality of source signal lines intersecting the plurality of gate lines and each adapted to supply a signal to a source electrode of each of the thin film transistors, a shortcircuiting ring for shortcircuiting each of the signal lines at the periphery of the transparent insulative substrate, and a thin film resistor having a resistance of 10 kΩ to 500 kΩ provided intermediate between an input terminal of each of the signal lines and the shortcircuiting ring.

Preferably, the thin film resistor comprises a transparent conductive film which is storage capacitance material since it is possible to easily form the thin film resistor at the time of the formation of the electrode of a capacitor or the pixel electrodes without requiring a special film formation step therefor by merely changing a mask for patterning.

Alternatively, the thin film resistor preferably comprises a silicon film and an overlying silicide film since it is possible to form the thin film transistor at the time of the formation of the semiconductor layer and overlying electrode layer of the TFTs provided to corresponding pixels without increasing the number of fabrication steps, as with the case of the above transparent conductive film.

Further, preferably, each of the source signal lines comprises a lower layer formed of a metal selected from the group consisting of Cr, Mo, Ta, W and Ni and an upper layer formed of a metal selected from the group consisting of Al, Ag and Cu, while the aforesaid silicide film is formed of a compound of silicon and the metal forming the lower layer of each of the source signal lines. This makes it possible to easily form the silicide film as having an appropriate resistance in the fabrication step for the formation of the source signal lines or drain electrodes.

According to another aspect of the present invention, there is provided a method for fabricating an active-matrix substrate including a transparent insulative substrate, thin film transistors arranged in a matrix pattern on the transparent substrate, pixel electrodes each connected to a drain electrode of each of the thin film transistors, a plurality of gate lines each adapted to supply a signal to a gate electrode of each of the thin film transistors, a plurality of source signal lines intersecting the plurality of gate lines and each adapted to supply a signal to a source electrode of each of the thin film transistors, a shortcircuiting ring for shortcircuiting each of the signal lines at the periphery of the transparent insulative substrate, and a thin film resistor having a resistance of 10 to 500 k$\Omega$ provided intermediate between an input terminal of each of the signal lines and the shortcircuiting ring, the method comprising the steps of:

forming a silicon layer as a semiconductor layer of each of the thin film transistor while forming a silicon layer of the thin film resistor between the input terminal of each of the signal lines and the shortcircuiting ring;

forming a contact layer, overlying the silicon layer, of each of the thin film transistor using an ion doping process; and forming a metal film of a same material as that of the source signal lines on the silicon layer of each of the thin film transistors and the silicon layer of the thin film resistor thereby forming the thin film resistor of a silicide film between the input terminal of each of the signal lines and the shortcircuiting ring.

In the present invention the input terminal of each of the signal lines including the source signal lines and the gate signal lines is connected to the shortcircuiting ring through the thin film resistor of 10 to 500 k$\Omega$. This allows the voltage of static electricity of a capacitance of about 0.1 to about 1 nF to decrease to 50 V or below in 0.01 seconds and hence makes it possible to protect the substrate even charged with static electricity from troubles such as shifting of the threshold voltage of TFT.

Further, since the resistance of the electric path between each signal line and the ground is 10 k$\Omega$ or higher, or 10 times or more as high as that of the circuit for electric test for characteristics of pixel such as TFT the leak current branched by the shortcircuiting ring assumes a value lower than 1/10 of the current for testing each pixel. Accordingly, the substrate can be tested for its characteristics of pixels such as TFT without any troubles. A possible shortcircuit between signal lines can also be detected since the test current is extraordinarily increased thereby.

Consequently, the substrate is protected from a break of a signal line or TFT, or a breakdown of the insulation film intermediate between signal lines, while allowing a test to be performed thereon for characteristics of pixel including TFT and for a possible shortcircuit between signal lines.

In the fabrication method of the present invention, since the contact layer is formed using the ion doping process, there is no need to pattern the contact layer nor to protect the resulting silicide film against etching. Therefore, a desired resistor can assuredly be formed with a few steps.

BRIEF DESCRIPTION OF THE DRAWINGS

FIGS. 5 (a) and 5(b) are sectional views taken along line A—A and line B—B, respectively, of FIG. 4;

DETAILED DESCRIPTION

An active-matrix substrate according to the present invention will now be described in detail with reference to the drawings.

Typically, a matrix-type display device such as an LCD includes a pair of transparent insulative substrates such as made of glass or a plastic, and a display material such as a liquid crystal sandwiched between the substrates. Each substrate has components, such as electrodes, for selectively applying a voltage to the display material. In an active-matrix drive display device, one transparent insulative substrate is provided with switching elements such as TFTs for turning ON or OFF desired pixels for displaying a desired image.

Figure 1:
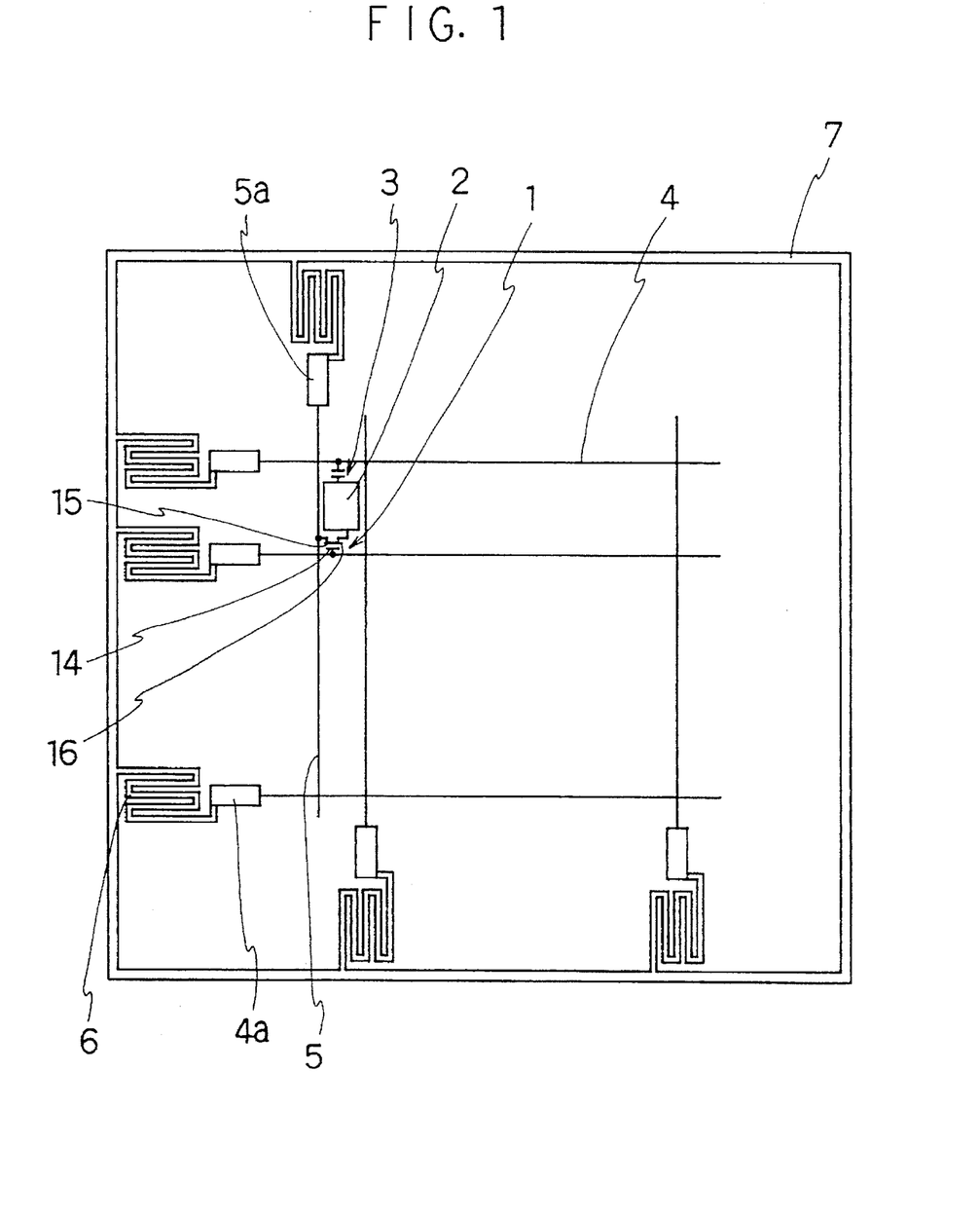
FIG. 1 is a schematic equivalent circuit diagram of one embodiment of an active-matrix substrate of the present invention.

FIG. 1 shows, on an equivalent circuit basis, the pattern of an active-matrix substrate comprising such a transparent insulative substrate having TFTs and pixel electrodes. In FIG. 1, drain electrode 16 of a TFT 1 is connected to a pixel electrode 2 which is connected to a capacitor 3. Gate electrode 14 of the TFT 1 is connected to a gate signal line 4 while source electrode 15 thereof is connected to a source signal line 5. The signal lines 4 and 5 terminate in input terminals 4a and 5a, respectively, at one ends thereof for receiving signals from an external drive circuit. The present invention is characterized in that each of the input terminals 4a and 5a is connected to a shortcircuiting ring 7 through a thin film resistor 6 of 10 to 500 k$\Omega$. As described hereinbefore intensive study has been repeatedly made to obtain an active-matrix substrate which is prevented from troubles such as a break down of signal lines 4,5 or TFT 1 or a breakdown of an insulator film intermediate between signal lines due to discharge between signal lines and which, in a state before being assembled into a display device, can be tested for its characteristics of pixel such as TFT or capacitor and for a possible shortcircuit between signal lines, by discharging static electricity which is likely to be generated during the fabrication process through the shortcircuiting ring 7. As a result, there has been found the fact that the thin film resistor 7 of 10 k$\Omega$ to 500 k$\Omega$ provided intermediate between each of the input terminals 4a,5a and the shortcircuiting ring 7 can be formed simultaneously with the formation of the TFT 1 or capacitor 3 in the same process without requiring a special fabrication process therefor, while being capable of serving as a shortcircuiting line for discharging static electricity in such a short time as not to cause troubles such as shifting of the threshold voltage of TFT and as an insulator when the substrate is tested for its characteristics of pixels such as TFT or capacitor.

More specifically, to make the thin film resistor serve as a shortcircuiting line for discharge of static electricity, the resistance of the thin film resistor is preferably as low as possible. However, the repeated intensive study has led to the finding that if there is provided a shortcircuiting circuit enabling the voltage of generated static electricity to decrease to 50 V or below in 0.01 seconds, the threshold voltage of TFT will not shift and hence the troubles due to threshold shift will not occur and, in addition thereto, there is no fear of a break down of a signal line or a breakdown of a insulator film intermediate between signal lines due to discharge of static electricity. To decrease the voltage of static electricity to 50 V or below in 0.01 seconds, the R-C constant has to be 0.001 seconds or less. Further, since a capacitance of about 0.1 to about 1 nF exists between gate line and source line of the TFT array, the thin film resistor is required to have a resistance of about 500 k$\Omega$ or lower. This resistance is desirably as low as possible to make static electricity to escape, preferably 300 k$\Omega$ or lower, more preferably 100 k$\Omega$ or lower.

Figure 2:
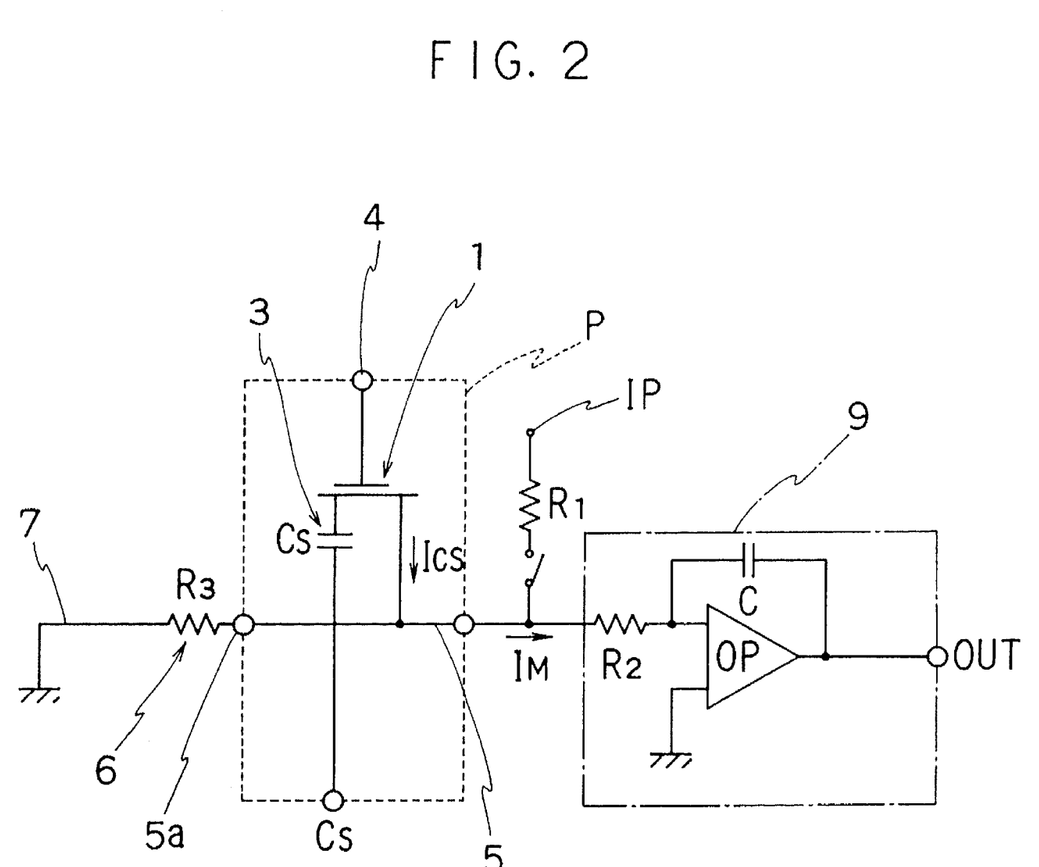
FIG. 2 is a diagram of an exemplary circuit for testing an active-matrix substrate in a state before assembled into a display device of the present invention for the capacitance of a pixel thereof.

On the other hand, the test on the substrate for the characteristics of pixels thereof such as TFT is achieved by applying a usual drive voltage to gate and source signal lines and measuring current $I_{cs}$ in each pixel. FIG. 2 illustrates the relation among a testing circuit, equivalent circuit of one pixel and a shortcircuiting ring. In FIG. 2, the section defined by the broken line P depicts one pixel on the substrate shown in FIG. 1. The circuit shown includes a TFT 1, a capacitor 3, a gate signal line 4, a source signal line 5, and a thin film resistor 6 (represented by $R_3$) connected between an input terminal 5a and a shortcircuiting ring 7. The testing circuit includes a resistor $R_2$ and an operational amplifier OP which are connected to the source signal line 5 for serving as, for example, an integrator. Between the input and output of the operational amplifier is connected a capacitor C. A signal is input to an input terminal IP of the source signal line 5 through a resistor $R_1$. In this configuration, electric charge $I_{cs}$ accumulated in the pixel section is detected from the output OUT of the testing circuit 9. The current output from this testing circuit 9 is current $I_M$ shunted from the current $I_{cs}$ of the electric charge accumulated within the pixel to the testing circuit side. Accordingly, when the resistance of the resistor $R_3$ decreases, current shunted to the shortcircuiting ring side increases and, hence, the current $I_M$ shunted to the testing circuit side decreases, resulting in impossibility of accurate testing. As a result of intensive study, there has been found that accurate testing is possible when the proportion of the current shunted to the shortcircuiting ring side is 10% or less, that is, the proportion of the current $I_M$ is 90% or more of the current $I_{cs}$. Since the resistors $R_2$ and $R_3$ are in parallel relation, the current $I_M$ branched to the testing circuit side and the resistors $R_2$ and $R_3$ hold the relation: $I_M=\{R_3/(R_2+R_3)\}I_{cs}$ where $0.9 \leq R_3/(R_2+R_3)$ or $9R_2 \leq R_3$. Accordingly, the thin film resistor $R_3$ needs to have a resistance nine times or more as large as that of the resistor $R_2$, of the integrator. The resistor $R_2$ of the testing circuit 9 usually has a resistance of 1 k$\Omega$ or lower and, hence, the higher the resistance of the resistor $R_3$ comprising the thin film resistor 6, the lesser the leakage current grows and the more accurate test can be expected. The resistance of the resistor $R_3$ is preferably 10 k$\Omega$ or higher, more preferably 50 k$\Omega$ or higher. The thin film resistor 6 with its resistance thus set allows the electric charge of the pixel to be accurately measured, thereby achieving the test on the substrate for its characteristics of pixel such as TFT or capacitor characteristics or for a possible shortcircuit between signal lines.

The structure of the thin film transistor and a fabrication method therefor will be described in more detail by way of specific examples thereof.

Example 1

Figure 4:
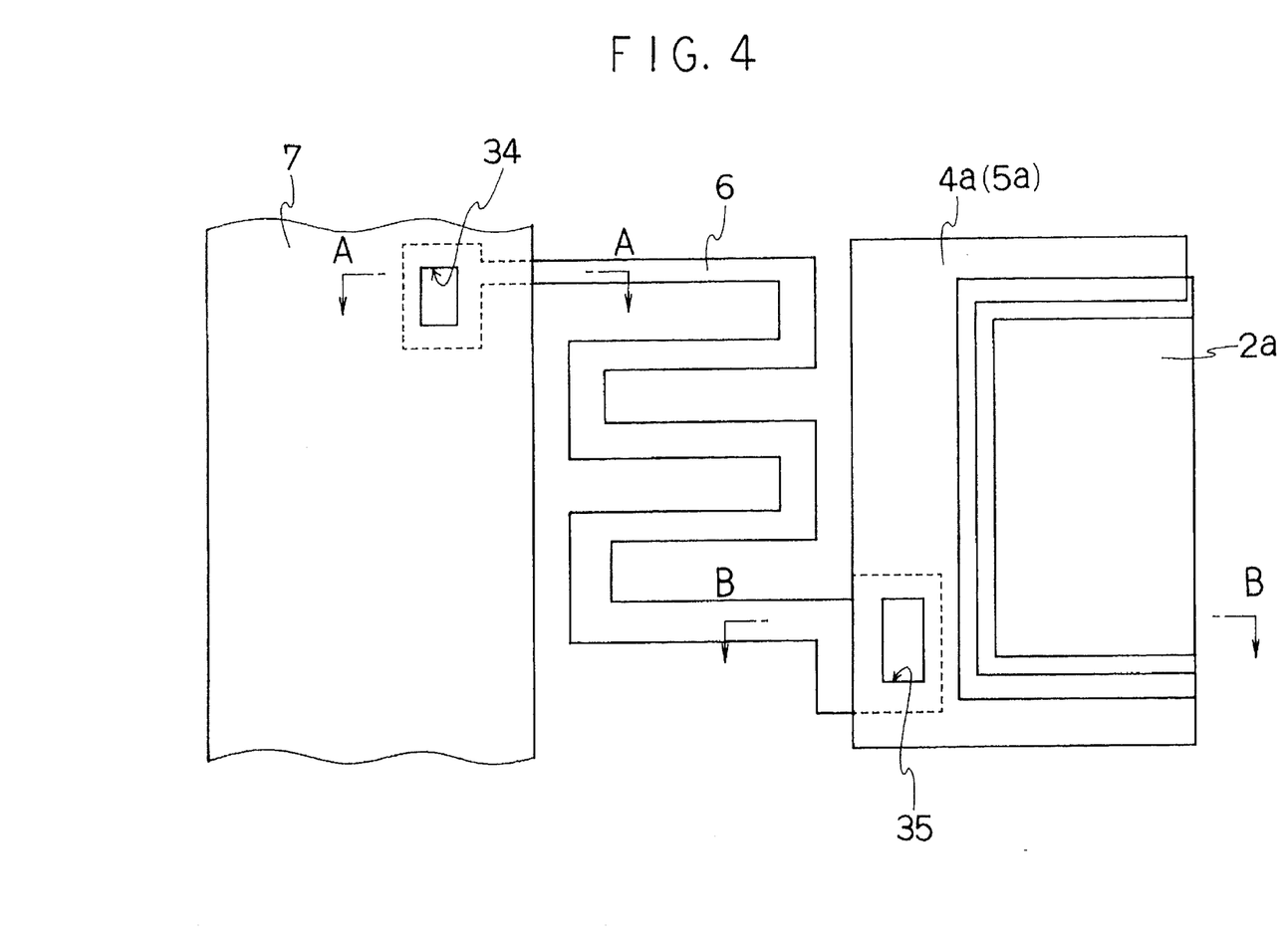
FIG. 4 is a fragmentary enlarged view of the active-matrix substrate in a portion around a thin film resistor thereof.
Figure 5A:
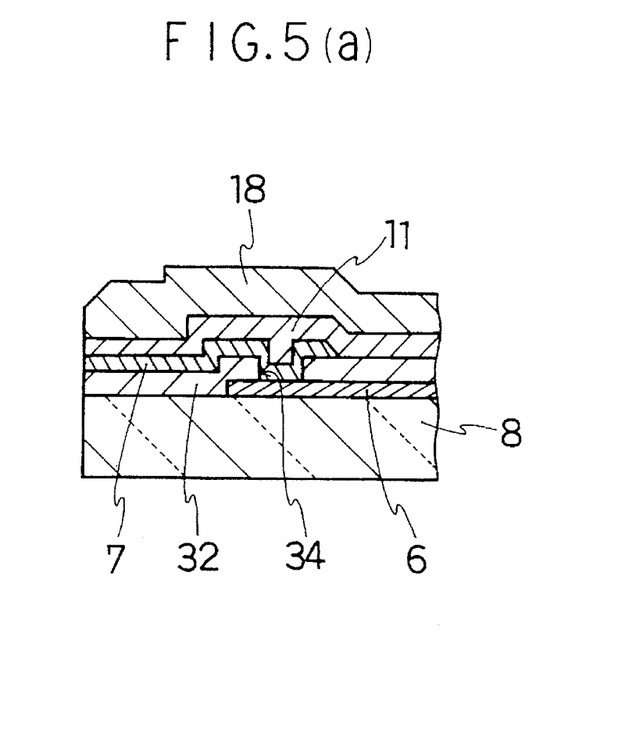
Figure 5B:
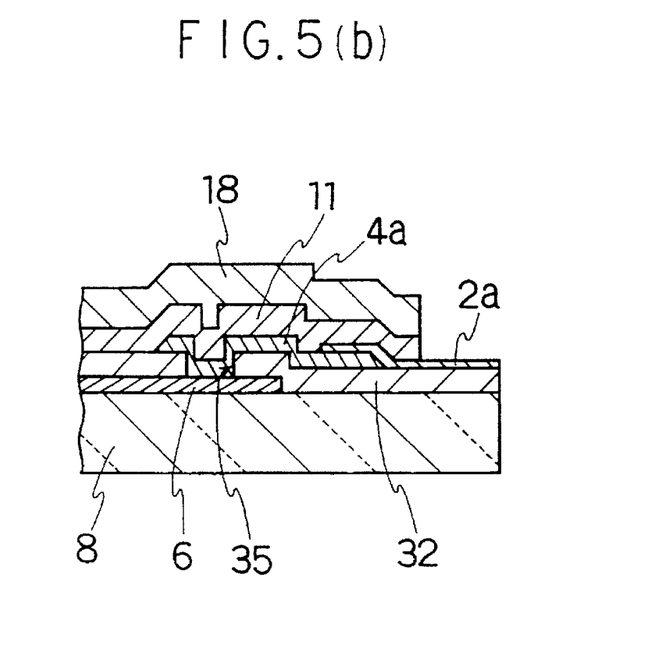
Figure 6:
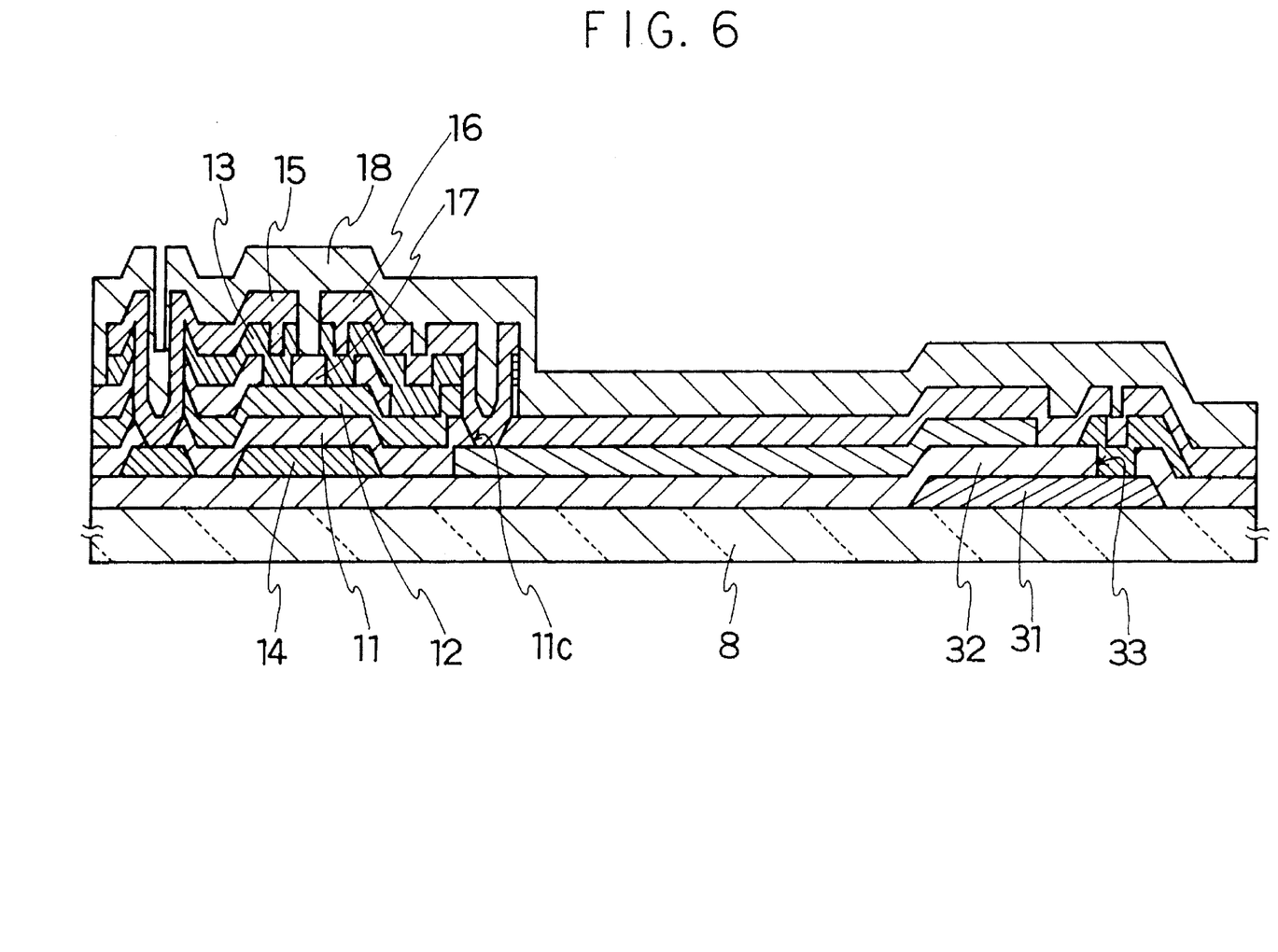
FIG. 6 is a sectional view of a pixel portion of the active-matrix substrate shown in FIG. 1.

FIG. 4 is an enlarged plan view of the thin film resistor and its periphery shown in FIG. 1; FIGS. 5(a) and 5(b) are sectional views taken along lines A—A and B—B, respectively, of FIG. 4; and FIG. 6 is a sectional view of a pixel portion.

This example is directed to an active-matrix substrate having a thin film resistor 6 comprising a transparent conductive film, such as an ITO film, which is also used for the electrode of a capacitor. To obtain the aforementioned resistance, the thin film resistor 6 herein is formed in a zigzag configuration as shown in FIG. 4. However, the configuration of the the thin film resistor 6 is not limited thereto since the resistance thereof depends on the thickness, width and length thereof. The ITO film is suitably 0.05 to 0.2 $\mu$m thick for facilitating the patterning thereof and for avoiding a cut-off of the pattern thereof and a shortcircuit due to unevenness. In this case, the ITO film desirably has a sheet resistance of 100 to 400 $\Omega$ per unit area.

Figure 3:
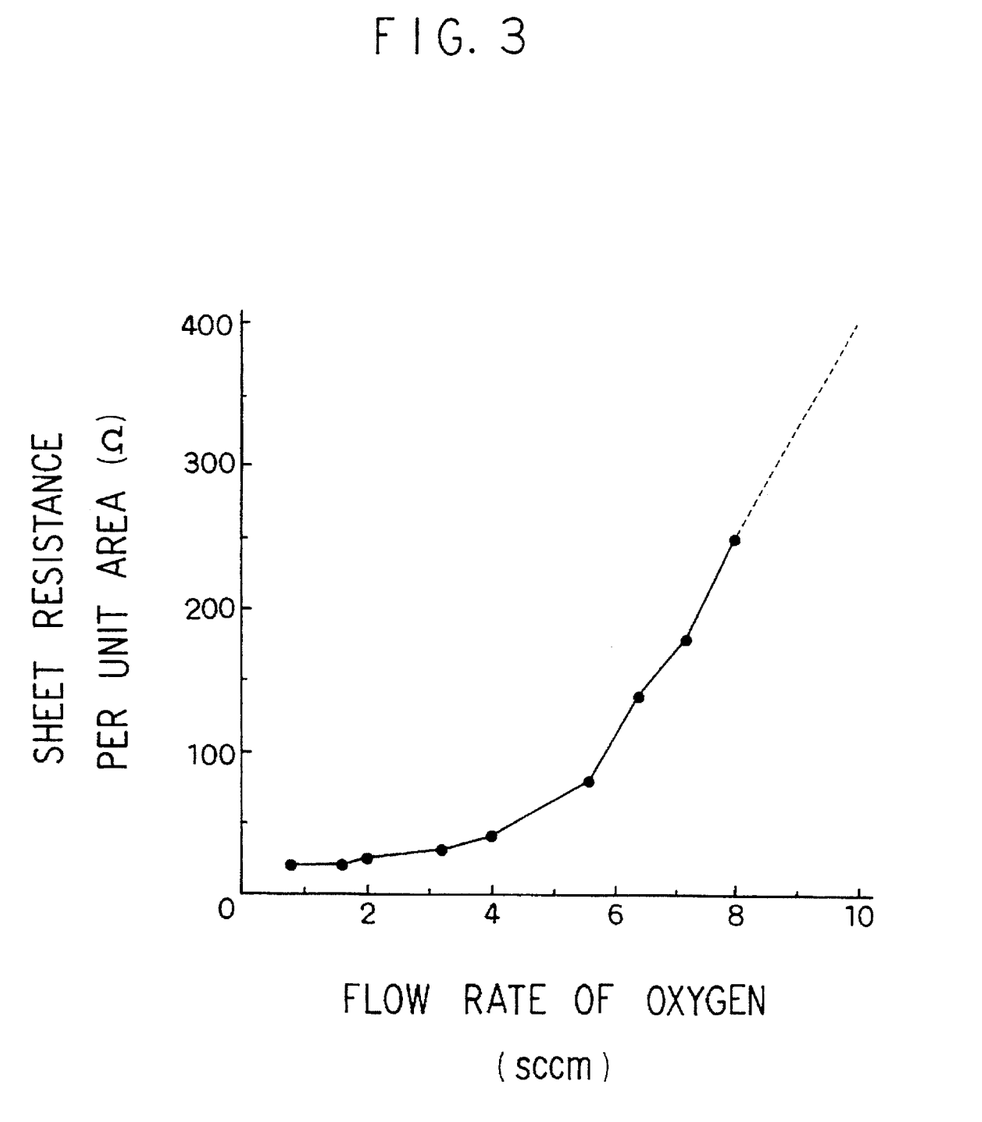
FIG. 3 is a graphic representation showing the relationship between the oxygen flow rate in the formation of an ITO film and the resistivity of the ITO film.

Since the transparent conductive film such as ITO film is an oxide film, the resistivity thereof can be adjusted by adjusting the flow rate of oxygen in forming the oxide film. FIG. 3 shows the relation between the flow rate of oxygen and the sheet resistance of oxide film having a thickness in the aforementioned range. As can he understood from FIG. 3 that the sheet resistance per unit area of oxide film having a thickness of about 0.05 to about 0.2 $\mu$m is adjusted to 100 to 400 $\Omega$ by setting the flow rate of oxygen to about 6 to about 10 sccm. Where an ITO film is to be formed as a usual electrode of a capacitor or pixel, the flow rate of oxygen is set to about 1 to about 3 sccm to adjust the sheet resistance of the ITO film to about 20 to about 30 $\Omega$. However, there will arise no problem even if the resistivity of a capacitor electrode or pixel electrode is set relatively high since little current flows in these electrodes. Therefore, it is possible to form the thin film resistor simultaneously with the formation of the capacitor electrode or pixel electrode with the resistivity thereof adjusted to a desired resistivity of the thin film resistor.

The active-matrix substrate according to this example is fabricated by the following method. Referring to FIG. 6, on a transparent insulative film 8 such as made of glass is formed a transparent conductive film of ITO, tin oxide, indium oxide or the like having a thickness of 0.05 to 0.2 $\mu$m to form a capacitor electrode 31. At this time the thin film resistor 6 is simultaneously formed as interconnecting the shortcircuiting ring 7 and the input terminal 5a of source signal line 5 or input terminal 4a of gate signal line 4. The thin film resistor 6 is so formed as to have the same thickness as the capacitor electrode 31, i.e., 0.05 to 0.2 $\mu$m, a width of 5 to 20 $\mu$m, a length of 1 to 3 mm in total, and a sheet resistance of about 100 to about 400 $\Omega$, thereby making the thin film resistor 6 have a resistance of about 10 to about 500 k$\Omega$ which allows a TFT or insulator film to be prevented from being broken and the substrate in a state before being assembled into a display device to be tested for its pixel characteristics.

As described above, the resistivity of the thin film resistor can readily be adjusted by adjusting the flow rate of oxygen used in sputtering, for example, an ITO film.

In turn, a capacitor insulating film 32 is formed by CVD, sputtering, EB evaporation or a like process, followed by forming a contact hole 33 extending to the capacitor electrode 31 to provide connection between the capacitor electrode 31 and the gate signal line 4. Simultaneously with the formation of the contact hole 33, contact holes 34 and 35 are also formed at terminal portions of the thin film resistor 6 to connect the thin film resistor 6 to the shortcircuiting ring 7 and to the source or gate terminal 5a or 4a, as shown in FIGS. 5 and 5b. Subsequently a metal film of Cr, Ta, Mo or the like is formed by sputtering, vacuum vapor deposition, CVD or a like process to form gate signal line 4 and gate electrode 14. At this time, the shortcircuiting ring 7 and the input terminal 5a of the source signal line 5 or the input terminal 4a of the gate signal line 4 are formed as connecting to the thin film resistor 6, as shown in FIG. 4. Further, the pixel electrode 2 shown in FIG. 1 is formed from a transparent electrode material such as ITO. At this time, ITO film 2a of the pixel electrode material is retained in a region of the input terminal 4a (5a) to facilitate the connection to an external circuit. Further, as shown in FIG. 6, there are sequentially formed an $Si_3N_4$ film to serve as a gate insulating film 11, a non-doped amorphous silicon layer 12 and an etch stopper 17 such as of $Si_3N_4$ by plasma CVD or a like process, followed by patterning the etch stopper 17. In turn, phosphorus-doped amorphous silicon layer 13 to serve as a contact layer is formed, followed by forming a contact hole 11c for providing connection between the pixel electrode 2 and the drain electrode 16 by a patterning process. Further, films of, for example, Cr and Al are formed by sputtering or the like, then patterned to form the source signal line 5 with source electrode 15 and the drain electrode 16. If the source signal line is multilayered as comprising a lower layer of a high melting point metal such as Cr, Mo, Ta, W or Ni having a thickness of about 0.01 to about 0.2 μm and an upper layer of a low-resistance metal such as Al, Ag or Cu, advantages will result that mutual diffusion between the underlying amorphous silicon layer and the low-resistance metal such as Al can be prevented while low-resistance source interconnection can be realized. In turn, unnecessary portions of the amorphous silicon layers 12 and 13 are removed using the source signal line 5, source electrode 15 and drain electrode 16 as a mask. Finally, a protective film 18 such as of $Si_3N_4$ is formed by CVD, sputtering, plasma CVD or a like process. Thus, the active-matrix substrate is completed.

Although the thin film resistor such as of ITO film is formed simultaneously with the formation of the capacitor in the present example, the thin film resistor may be formed simultaneously with the formation of the pixel electrode. In this case, also, it is possible to easily form the thin film resistor without requiring a special process therefor.

Example 2

Figure 7A:
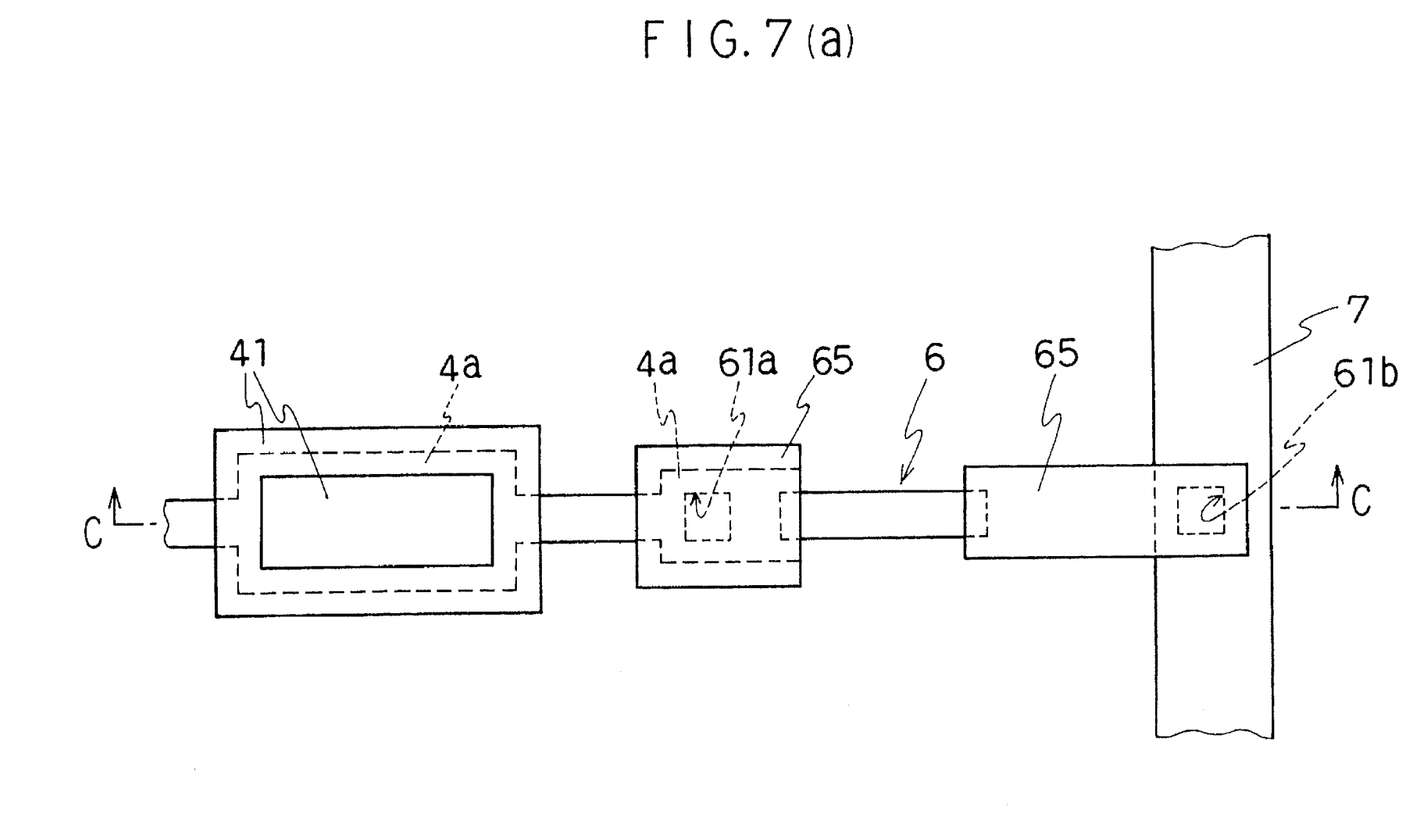
FIGS. 7(a) and 7(b) are an explanatory plan view and an explanatory sectional view, respectively, of an embodiment of an active-matrix substrate having a thin film resistor comprising an amorphous silicon layer and its silicide layer.
Figure 7B:
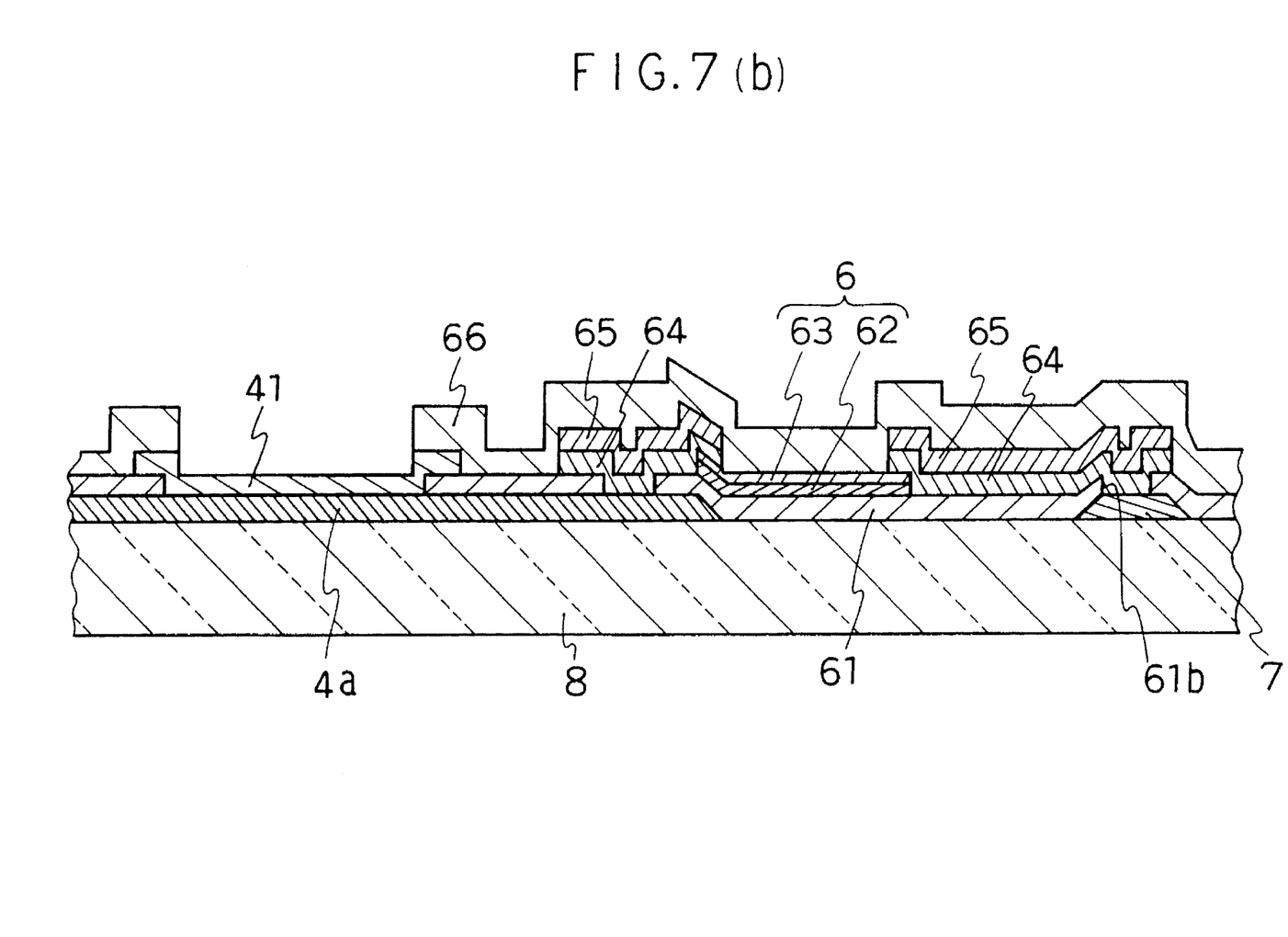

This example is directed to an active-matrix substrate having a thin film resistor formed not of the foregoing transparent conductive film such as ITO film but of a film of a silicide produced in the foregoing TFT formation process as a compound of the amorphous silicon layer and the overlying electrode material. FIGS. 7(a) and (b) illustrate a portion including the thin film resistor in plan and in section, respectively.

The thin film resistor 6 is preferably formed in the TFT fabrication process, as in Example 1. First, in the same manner as in Example 1 or in a manner in which the order of formation of the capacitor electrode and gate electrode is reversed, there are formed an input terminal 4a of gate signal line, a shortcircuiting ring 7 and the like. Further, there are sequentially formed an insulating film 61 such as of $Si_3N_4$ together with a gate insulating film, a non-doped amorphous silicon (i—a—Si) layer 62 and an etch stopper such as of $Si_3N_4$ (not shown) by plasma CVD or a like process. Thereafter, the etch stopper and non-doped amorphous silicon layer 62 are successively patterned in an island configuration and then unnecessary portions of the amorphous silicon layer are removed, followed by patterning the etch stopper in the channel region of TFT and in the region for the thin film resistor 6. At this time, the insulating film in the region for the thin film resistor which has been formed simultaneously with the etch stopper is removed.

In turn, the amorphous silicon layer is doped with phosphorus by ion doping technique to turn it into a phosphorus-doped amorphous silicon layer. The doping of phosphorus provides ohmic contact in the TFT section. Therefore, it is unnecessary to dope the amorphous silicon layer only for the purpose of forming a silicide film in the region for the thin film resistor 6.

The use of the ion doping technique offers an advantage over a method of independently forming phosphorus-doped amorphous silicon layers that the step of protecting the silicide resistor can be omitted since there is no need to provide the step of removing the phosphorus-doped amorphous silicon layer after the formation of the electrodes of source and drain.

A pixel electrode is then formed, followed by the formation of contact holes 61a and 61b. If a transparent conductive film 41 formed in the formation of the pixel electrode or capacitor electrode is retained on the input terminal 4a, the input terminal will be advantageously connected to a lead terminal of an external circuit.

Further, the oxide film and the like on the amorphous silicon layer 62 are removed using buffered hydrofluoric acid (BHF) or the like, and thereafter Cr film 64 and Al film 65 are formed by sputtering or the like at a substrate temperature of 200° to 300° C. and then patterned to form source signal line and drain electrode. In forming the source signal line and drain electrode, a Cr silicide film 63 is formed as having a thickness of several tens angstroms by the reaction of Cr and amorphous silicon. The sheet resistance per unit area of the silicide film having such thickness is about 1 to about 10 kΩ. Hence, the thin film resistor in the configuration shown in FIG. 7 readily provides a resistance of 10 to 500 kΩ. It is, therefore, unnecessary to form the thin film resistor in the zigzag configuration shown in FIG. 1 or FIG. 4. It should be noted that a non-doped amorphous silicon layer of about 0.1 μm thickness has a sheet resistance per unit area of about $10 \times 10^{13}$ to about $10 \times 10^{15}$ Ω, while a phosphorus-doped amorphous silicon layer of the same thickness has a sheet resistance per unit area of about $1 \times 10^6$ to about $10 \times 10^8$ Ω. Although these layers have such a significant difference in sheet resistance, the sheet resistance of the silicide film is not dependent on whether the silicon layer is doped or non-doped since it is still lower than the sheet resistance of the silicon layer.

In the present example, the metal film is formed on the amorphous silicon layer as having a double layer structure comprising Cr layer and Al layer. This is because the high melting point metal having a relatively high resistance such as Cr, Mo, Ta, W or Ni is preferable to form the silicide while in contrast the source signal line to be formed simultaneously with silicide is required to have a low resistance. For that reason, the upper metal layer is formed of a metal of low resistance such as Al, Ag or Cu. By so doing can the thin film resistor of silicide be formed simultaneously with the formation of the source signal line and drain electrode without increasing the number of fabrication steps.

Although the semiconductor layer is formed of amorphous silicon in the present example, it may be formed of polysilicon instead. Further, although Cr is used in the formation of the silicide film, the use of Mo, Ta, W, Ni, or the like will provide a silicide film of a sheet resistance substantially equal to that of the silicide film formed using Cr.

Further, although a capacitor is provided in any of the foregoing examples, it is needless to say that the present invention is applicable to the case of a substrate not provided with a capacitor.

As has been described, according to the present invention, the input terminal of each of source signal line and gate signal line is connected to a shortcircuiting ring through a thin film resistor having a resistance of 10 to 500 k$\Omega$. Hence, even when the active-matrix substrate is charged with static electricity during the fabrication process, the static electricity is discharged to the shortcircuiting ring through the thin film resistor, at the same time the provision of the thin film resistor allows the substrate in a state prior to assembled into a display device to be tested for its characteristics of pixels such as TFT and for a possible shortcircuit between signal lines.

As a result, the TFTs of the substrate can be prevented from being broken even when the substrate is charged with static electricity, and signal lines and interlayer insulator films therebetween can be protected from being broken by discharge of static electricity between signal lines. This results in the substrate of significantly improved reliability. Further, since the active-matrix substrate of the present invention can be tested in a state prior to being assembled into a display device for its pixel characteristics such as TFT characteristics and for possible abnormalities such as a shortcircuit between signal lines, it is possible to immediately feed back the cause of an abnormality to the associated fabrication process so as to refine the process, and further, to eliminate a defective substrate before bonded to a counterpart substrate. Accordingly, there is no likelihood of wasting expensive parts of the couterpart substrate such as a color filter, thus leading to a great contribution to an improved production yield and less costly production.

While only certain presently preferred embodiments have been described in detail, as will be apparent with those familiar with the art, certain changes and modifications can be made without departing from the spirit and scope of the invention as defined by the following claims.

What is claimed is:

1. An active-matrix substrate comprising a transparent insulative substrate, thin film transistors arranged in a matrix pattern on the transparent substrate, pixel electrodes each connected to a drain electrode of each of the thin film transistors, a plurality of gate lines each adapted to supply a signal to a gate electrode of each of the thin film transistors, a plurality of source signal lines intersecting the plurality of gate lines and each adapted to supply a signal to a source electrode of each of the thin film transistors, a single shortcircuiting ring for shortcircuiting each of the signal lines at the outermost periphery of the transparent insulative substrate, and a thin film resistor having a resistance of 10 k$\Omega$ to 500 k$\Omega$ provided intermediate between an input terminal of each of the signal lines and the single shortcircuiting ring wherein the thin film resistor comprises a silicon film & a silicide film overlying the silicon film.

2. The active-matrix substrate of claim 1, wherein each of said source signal lines comprises a lower layer formed of a metal selected from the group consisting of Cr, Mo, TA, W and Ni and an upper layer formed of a metal selected from the group consisting of Al, Ag and Cu, while said silicide film is formed of a compound of silicon and the metal forming the lower layer of each of the source signal lines.

3. The active-matrix substrate of claim 1, wherein the thin film resistors are positioned inwardly on the substrate with respect to the shortcircuiting ring and the input terminals are positioned inwardly on the substrate with respect to the thin film resistors.

4. The active matrix substrate of claim 1, wherein the thin film resistor comprises a silicide film having a sheet resistance of between 1 k$\Omega$ to 10 k$\Omega$ per unit area.

* * * * *